(12) United States Patent
Li et al.

(10) Patent No.: US 9,396,247 B2
(45) Date of Patent: Jul. 19, 2016

(54) METHOD AND DEVICE FOR PROCESSING A TIME SEQUENCE BASED ON DIMENSIONALITY REDUCTION

(71) Applicant: NEC (China) Co., Ltd., Beijing (CN)

(72) Inventors: Jianqiang Li, Beijing (CN); Chunchen Liu, Beijing (CN); Bo Liu, Beijing (CN)

(73) Assignee: NEC (CHINA) CO., LTD., Beijing (CN)

( * ) Notice: Subject to any disclaimer, the term of this patent is extended or adjusted under 35 U.S.C. 154(b) by 210 days.

(21) Appl. No.: 14/203,852

(22) Filed: Mar. 11, 2014

(65) Prior Publication Data

US 2014/0297606 A1  Oct. 2, 2014

(30) Foreign Application Priority Data

Mar. 28, 2013 (CN) .......................... 2013 1 0105366

(51) Int. Cl.
*G06F 17/30* (2006.01)
(52) U.S. Cl.
CPC ................................ *G06F 17/30592* (2013.01)
(58) Field of Classification Search
USPC ........................................................ 707/693
See application file for complete search history.

(56) References Cited

U.S. PATENT DOCUMENTS

| 8,655,887 B2* | 2/2014 | Liu ................... G06F 17/30516 707/741 |
| 2008/0071843 A1* | 3/2008 | Papadimitriou .. G06F 17/30592 |
| 2012/0162293 A1* | 6/2012 | Hudson ................ G09G 3/2014 345/691 |

OTHER PUBLICATIONS

Chen, Q., et al. "Indexable PLA for Efficient Similarity Search" Proceedings of the 33rd International Conference on Very Large Data Bases (VLDB '07). Sep. 2007. (12 Pages).

* cited by examiner

*Primary Examiner* — Kuen Lu
(74) *Attorney, Agent, or Firm* — Tutunjian & Bitetto, P.C.

(57) ABSTRACT

Disclosed is a method and device for processing a time sequence based on dimensionality reduction, belonging to the technical field of computers. The method includes: acquiring at least one to-be-processed time sequence; processing the at least one time sequence based on Piecewise Linear Approximation (PLA) where a time length of a time segment processed by PLA is unfixed and is an integral multiple of a preset unit time length. According to the present disclosure, a space for storing a time sequence may be reduced.

17 Claims, 2 Drawing Sheets

METHOD AND DEVICE FOR PROCESSING A TIME SEQUENCE BASED ON DIMENSIONALITY REDUCTION

TECHNICAL FIELD

The present disclosure relates to the technical field of computers, and in particular, to a method and device for processing a time sequence based on dimensionality reduction.

BACKGROUND

With rapid development of database technologies, people are more and more concerned with how to acquire valuable information from a large volume of data. This process may be referred to as large data analysis. The large data analysis in practice is directed to time series data in many cases. The time series data refers to chronologically recorded data columns under a unified index, such as transaction data of the stock market, status data collected over sensor networks, statistical data of consumption in shops, and statistical data of telephone communication traffic.

The volume of the time series data is very large. In order to facilitate storage and retrieval of the time series data, the time series data is processed based on dimensionality reduction, i.e., data with more time points is compressed into data with less time points. Piecewise Linear Approximation (PLA) is a common method for dimensionality reduction. For PLA, the time series data is partitioned into small time segments, and in each time segment, data of the time segment is approximated by a line segment with a certain slope. As such, a space for storing the processed time sequences may be reduced effectively just by storing a start time point and end time point of the line segment corresponding to each time segment and the corresponding linear parameter (a coefficient of a linear equation to which the line segment pertains).

Similarity retrieval of the time series data is an analysis means commonly used in the big data analysis, including the following steps of: dividing the large time series data into a large amount of time sequences with the same time length for storage, and querying, from the stored time sequences, a time sequence matching with the target time sequence to be retrieved (the target time sequence has the same time length as the stored time sequences). For example, in an electrocardiogram, the frequency of occurrence of a certain characteristic waveform may be used for identifying a disease. The characteristic waveform may be retrieved from the recorded electrocardiogram and disease analysis may be carried out based on a result of retrieval. For ease of retrieval, the stored time sequences and the target time sequence are generally processed based on fixed-length PLA where a to-be-processed time sequence based on PLA is partitioned into a plurality of time segments with the same time length.

During implementation of the present disclosure, the inventors have identified that the prior art has at least the following problem:

In the prior art, a time sequence is processed based on fixed-length PLA during storing of the time sequence; however, for fixed-length PLA, the precision of data needs to be ensured by shortening the time length of the time segment, resulting in the increase of the volume of data to be stored and more consumption of the storage space.

SUMMARY

To solve the problem in the prior art, embodiments of the present disclosure provide a method and device for processing a time sequence based on dimensionality reduction to reduce a space for storing time sequences. The technical solutions are as follows.

In one aspect, a method for processing a time sequence based on dimensionality reduction is provided, including:

acquiring at least one to-be-processed time sequence; and processing the at least one time sequence based on PLA where a time length of a time segment processed by PLA is unfixed and is an integral multiple of a preset unit time length.

In another aspect, a method for retrieving a time sequence is provided, where time sequences processed according to the method for processing a time sequence based on dimensionality reduction are pre-stored; the method including:

receiving a query request carrying a target time sequence;

processing the target time sequence based on dimensionality reduction, in the same manner as that for processing the stored time sequences based on dimensionality reduction; and querying, from the stored time sequences, at least one time sequence matching with the processed target time sequence.

In yet another aspect, a device for processing a time sequence based on dimensionality reduction is provided, including:

an acquiring module, configured to acquire at least one to-be-processed time sequence; and a processing module, configured to process the at least one time sequence based on PLA where a time length of a time segment processed by PLA is unfixed and is an integral multiple of a preset unit time length.

In still another aspect, a device for retrieving a time sequence is provided, including a storing module, configured to pre-store the time sequences processed by the device for processing a time sequence based on dimensionality reduction, a receiving module, configured to receive a query request carrying a target time sequence;

a processing module, configured to process the target time sequence based on dimensionality reduction, in the same manner as that for processing the stored time sequences based on dimensionality reduction; and a querying module, configured to query, from the stored time sequences, at least one time sequence matching with the processed target time sequence.

The technical solutions provided in the embodiments of the present disclosure create the following beneficial effects:

According to the embodiments of the present disclosure, a time sequence is processed based on dimensionality reduction based on PLA where a time length of a time segment is unfixed and is an integral multiple of a preset unit time length. As such, compared with fixed-length PLA, a plurality of time segments in fixed-length PLA may be replaced by one time segment in PLA, thereby reducing a space for storing the time sequence.

BRIEF DESCRIPTION OF THE DRAWINGS

To describe the technical solutions in the embodiments of the present disclosure more clearly, the accompanying drawings to be used for describing the embodiments will be briefly introduced as below. Apparently, the accompanying drawings in the following description illustrate merely some exemplary embodiments of the present disclosure, and persons of ordinary skill in the art may still derive other drawings from these accompanying drawings without creative efforts.

DETAILED DESCRIPTION

To make the objects, technical solutions and advantages of the present disclosure clearer, the embodiments of the present disclosure will be further described as below in detail with reference to the accompanying drawings.

Figure 1:
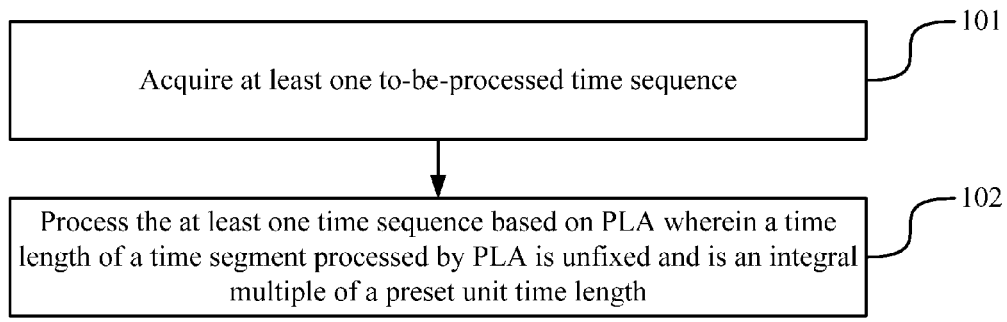
FIG. 1 is a flowchart of a method for processing a time sequence based on dimensionality reduction according to an embodiment of the present disclosure.

An embodiment of the present disclosure provides a method for processing a time sequence based on dimensionality reduction. As a method used for processing a time sequence based on dimensionality reduction and storing it, the method provided in the present disclosure may be applied to a database in which a number of time sequences are to be stored. As shown in FIG. 1, a process of the method includes the following steps:

Step 101: At least one to-be-processed time sequence is acquired.

A database for storing time series data generated in real time is used as an example herein. New time series data are continuously generated over time, and a certain time length (a time length of a preset time sequence) later, the time series data generated within this time length may be acquired as a to-be-processed time sequence; then the subsequent operation of dimensionality reduction may be further performed. In addition, in this step, a time sequence pre-stored in the database may also be acquired, used as the to-be-processed time sequence, and then processed based on the subsequent dimensionality reduction. In addition, in this step, a target time sequence for time sequence retrieval may also be acquired and then processed based on the subsequent dimensionality reduction.

Step 102: The acquired time sequence is processed based on PLA where a time length of a time segment processed by PLA is unfixed and is an integral multiple of a preset unit time length.

The unit time length may be preset as 1/N of the time length of a time sequence (N may be any positive integer and the value of N may be set according to requirements on the precision and processing speed). The time length of each time segment may be any integral multiple (smaller than N) of the unit time length, and the time segments may have different time lengths. As such, during the processing based on PLA, the time length of the time segment may be freely selected. This enables the processing based on PLA to follow as far as possible the principle of PLA that time segments are partitioned according to the change trend of data. That is, time segments are partitioned as far as possible close a time point when the data changes (for example, from an increasing trend to a decreasing trend) along with the change trend of time (this is the principle of PLA at the beginning of design, which is actually damaged in fixed-length PLA to some extent).

After step 102, the method further includes a step of storing the processed time sequence.

The processed time sequence is a dimensionality-reduced time sequence processed based on PLA. The content of the processed time sequence may include a start time point and linear parameters of the time segments chronologically arranged. An end time point of a time segment is a start time point of a next time segment, so that the end time point of a time segment does not need to be recorded. The linear parameter of a time segment may be a coefficient in a functional expression of a straight line to which a line segment corresponding to the time segment belongs, that is, a and b in $f(x)=ax+b$, where, x is a time variable and $f(x)$ is data corresponding to the time point.

In the embodiments of the present disclosure, there may be a variety of specific implementation methods for the process in step 102, some of which will be described as below.

The first method includes the following steps:

Step 1: The acquired time sequence is processed based on PLA where the time length of a time segment is a preset unit time length, where the time length of the time sequence is an integral multiple of the preset unit time length.

In this method, the time sequence is processed based on fixed-length PLA where a time length of a time segment is a unit time length at first, and then the time segments are merged.

Step 2: A plurality of sequentially contiguous time segments are merged, if line segments corresponding to the plurality of sequentially contiguous time segments, among all time segments with the time length being the unit time length, meet a preset approximate condition.

The time segments with the time length being the unit time length are the time segments partitioned based on fixed-length PLA in the above step. The approximate condition is a requirement on degree of approximation among all time segments, and these time segments are merged if the line segments corresponding to the plurality of sequentially contiguous time segments meet a certain requirement on degree of approximation.

The merging process may include the following steps: merging a plurality of sequentially contiguous time segments into one time segment, using a line segment corresponding to the time segment acquired by merging for approximately representing a broken line composed of the line segments corresponding to the plurality of time segments. Time points of two endpoints of the time segment acquired by merging may be a start time point and an end time point of the time segment. The data values at the two endpoints of the time segment acquired by merging may be determined by the data values of the time sequence at the start time point and the end time point. For example, a data value where a difference between it and data value of the start time point is smaller than a certain threshold may be selected as the data value at the first endpoint, and a data value where a difference between it and data value of the end time point is smaller than a certain threshold may be selected as the data value at the second endpoint. Preferably, the data values at the two endpoints of the time segment acquired by merging may be the data values of the time sequence at the start time point and the end time point. That is, the line segment corresponding to the time segment acquired by merging is a connection line of two outermost endpoints among the end points of the line segments corresponding to the plurality of sequentially contiguous time segments.

According to the merging process, a plurality of groups of data (each group of data includes a start time point and linear parameters) corresponding to the plurality of time segments before merging may be simplified into a group of data corresponding to a merged time segment.

Specifically, step 2 may include the following steps: a plurality of sequentially contiguous time segments are merged, if the absolute value of a slope difference between the line segments corresponding to the plurality of sequentially contiguous time segments, among all time segments with the time length being the unit time length, is smaller than a preset first threshold. The plurality of sequentially contiguous time segments may refer to two time segments or more than two time segments. Herein, a merging condition is that the absolute value of a slope difference between each two of the line segments corresponding to the plurality of sequentially contiguous time segments is smaller than the first threshold. Further, implementation manners as below may be employed during implementation of this step.

The first manner may include the following steps during the specific implementation:

Step A: A time segment at the first end of a time sequence is set as a first reference time segment, among all time segments with the time length being the unit time length.

The two ends of the time sequence may be defined as a first end and a second end, where the first end may be a foremost end or rearmost end of the time sequence.

Step B: It is determined whether the first reference time segment is the time segment at the second end of the time sequence, if positive, the process is ended; if negative, a time segment, adjacent to the first reference time segment and close to the second end of the time sequence, is set as a second reference time segment.

If the first end of the time sequence is defined as the foremost end of the time sequence, the second end of the time sequence is the rearmost end; and if the first end is defined as the rearmost end of the time sequence, the second end of the time sequence is the foremost end. A time segment, adjacent to the second reference time segment and close to the second end of the time sequence, is a time segment which is closer to the second end of time sequence among the time segments adjacent to the first reference time segment.

Step C: It is determined whether the absolute value of a slope difference between a line segment corresponding to the first reference time segment and a line segment corresponding to the second reference time segment is smaller than the preset first threshold, if positive, step D is performed; and if negative, step E is performed.

The value of the first threshold may be set according to the requirements on precision, storage space occupation and processing speed. The approximate slopes of the two line segments indicate that the two straight lines containing the two line segments are relatively approximate. If the line segments are merged, the precision of the data will be hardly affected, so that the occupied storage space may be reduced.

Step D: It is determined whether the second reference time segment is a time segment at the second end of the time sequence, if positive, a plurality of sequentially contiguous time segments from the first reference time segment to the second reference time segment are merged, and the process is ended; if negative, a time segment, adjacent to the second reference time segment and close to the second end of the time sequence, is set as the second reference time segment, and then step C is performed again.

Specifically, during merging the plurality of sequentially contiguous time segments from the first reference time segment to the second reference time segment, if the first reference time segment and the second reference time segment are adjacent time segments, the first reference time segment and the second reference time segment may be merged; and if the first reference time segment and the second reference time segment are not adjacent time segments, the first reference time segment, the second reference time segment and the time segments therebetween may be merged.

Step E: It is determined whether the first reference time segment is a time segment adjacent to the second reference time segment, if positive, the second reference time segment is set as the first reference time segment and then step B is performed again; if negative, a plurality of sequentially contiguous time segments, including the time segments between the first reference time segment and the second reference time segment as well as the first reference time segment, are merged, the second reference time segment is set as the first reference time segment, and then step B is performed again.

In the above process, the slopes of line segments in each time segment are compared in order with those in the first time segment from one end to the other end of the time sequence. The time segments, from the first time segment to a time segment prior to the current time segment, are merged until a slope difference between the current time segment and the first time segment reaches the first threshold, and then the above process is repeated by using the current time segment as the first time segment up to the time segment at the other end of the time sequence.

The above process will be described as below by a specific example. It is assumed that a time sequence is partitioned into five time segments, with the time length being the unit time length, i.e., time segments 1-5 from front to back, respectively. At first, a slope of a line segment in the time segment 2 is compared with that in the time segment 1, and the slope difference is assumed to be smaller than the first threshold. Secondly, a slope of a line segment in the time segment 3 is continuously compared with that in the time segment 1, and the slope difference is assumed to be still smaller than the first threshold. Thirdly, a slope of a line segment in the time segment 4 is continuously compared with that in the time segment 1, and the slope difference is assumed to be greater than the first threshold. In this case, the time segment 1, the time segment 2 and the time segment 3 are merged. Finally, from the time segment 4, a slope of a line segment in the time segment 5 is compared with that in the time segment 4, and the slope difference is assumed to be smaller than the first threshold. In this case, the time segment 4 and the time segment 5 are merged, and the process is ended.

The second way may include the following steps during the specific implementation:

Step H: A time segment at the first end of the time sequence is set as a third reference time segment, among all time segments with the time length being the unit time length.

Step I: It is determined whether the third reference time segment is a time segment at the second end of the time sequence, if so, the process is ended; if not, a step J is performed.

Step J: It is determined whether the absolute value of a slope difference between a line segment corresponding to a time segment adjacent to the third reference time segment and close to the second end of the time sequence and a line segment corresponding to the third reference time segment is smaller than the preset first threshold, if so, a step K is performed; if not, a step L is performed.

The value of the first threshold may be set according to the requirements on precision, storage space occupation and processing speed.

Step K: A plurality of sequentially contiguous time segments, including a time segment adjacent to the third reference time segment and close to the second end of the time sequence as well as the third reference time segment, are merged, the time segment acquired by merging is set as the third reference time segment, and then step I is performed again.

Step L: A time segment, adjacent to the third reference time segment and close to the second end of the time sequence, is set as the third reference time segment, and then step I is performed.

In the above steps, from one end to the other end of the time sequence, the slopes of line segments in each time segment are compared one by one. If a slope difference between the adjacent time segments is smaller than the first threshold, the time segments are merged, and then the slope of the merged time segment is compared with that of an adjacent time segment next to the merged time segment, and so on.

The above process will be described as below by a specific example. It is assumed that a time sequence is partitioned into five time segments, with the time length being the unit time length, i.e., time segments 1-5 from front to back, respectively. At first, a slope of a line segment in the time segment 2 is compared with that in the time segment 1, and the time segment 1 and the time segment 2 are merged to acquire a time segment 2' if the slope difference is smaller than the first threshold. Secondly, a slope of a line segment in the time segment 3 is compared with that in the time segment 2', and the time segment 2' and the time segment 3 are merged to acquire a time segment 3' if the slope difference is still smaller than the first threshold. Thirdly, a slope of a line segment in the time segment 4 is compared with that in the time segment 3'. If the slope difference is greater than the first threshold, comparison is performed from the time segment 4. A slope of a line segment in the time segment 5 is compared with that in the time segment 4. If the slope difference is smaller than the first threshold, the time segment 4 and the time segment 5 are merged, and the process is ended.

The second method may include the following steps:

Step 1: Time points are determined within a time range corresponding to the time length of the acquired time sequence, the time length of these time points (these time points may be called unit time points) to the start time point or the end time point of the time sequence being an integral multiple of the preset unit time length, and the time length of the time sequence being an integral multiple of the unit time length.

Because the time length of the time sequence is an integral multiple of the unit time length, a time length from a time point having a time length of an integral multiple of the unit time length to the start time point of the time sequence to the end time point of the time sequence is also an integral multiple of the unit time length.

Step 2: at least one boundary time point of a time segment is selected from the determined time point according to time points of peaks and troughs in a waveform of the time sequence.

Specifically, for the time point of each peak, one or more time points, from which a distance to the time point of each peak is smaller than a certain preset time length, may be selected from the determined time points. For the time point of each trough, one or more time points, from which a distance to the time point of each trough is smaller than a certain preset time length, may be selected from the determined time points. The selected time points are used as boundary time points of the time segments. As such, the boundary time points of the time segments are selected to be processed based on PLA. It may be ensured as far as possible that the time segments are partitioned according to the change trend of data and can ensure the precision of data while saving a storage space.

Preferably, at least one time point, from which a distance to the time point of each peak is smaller than the unit time length, and at least one time point, from which a distance to the time point of each trough is smaller than the unit time length, may be selected from the determined time points, and the selected time points may be used as the boundary time points of a time segment. Specifically, at least one unit time point, from which a distance to the time points of each peak and each trough is smaller than the unit time length, may be selected as the boundary time point of a time segment. If the time points of one peak or one trough are superposed with a certain unit time point, there is only one time point from which a distance to the time points of one peak or one trough is smaller than the unit time length among the unit time points, i.e., the superposed time point, in this case, this time point may be selected as the boundary time point of a time segment. If the time points of one peak or one trough are located between two unit time points, there are two time points from which a distance to the time points of one peak or one trough is smaller than the unit time length among the unit time points, i.e., the two unit time points. In this case, one of the two unit time points may be selected as the boundary time point of a time segment, or both of the two unit time points may be selected as the boundary time points of the time segment.

Preferably, at least one time point, from which a distance to the time point of each peak is minimum, and at least one time point, from which a distance to the time point of each trough is minimum, may be selected from the determined time points, and the selected time points are used as the boundary time points of a time segment. Specifically, one unit time point, from which a distance to the time points of each peak and each trough is minimum, may be selected as the boundary time point of a time segment. As such, the boundary time points of the time segments are selected to be processed based on PLA, to effectively ensure the precision of data of the time sequence processed based on PLA.

Step 3: The time sequence is processed based on PLA according to the selected boundary time points of the time segments.

This method is simple in process and may effectively improve the processing efficiency in step 102.

Figure 2:
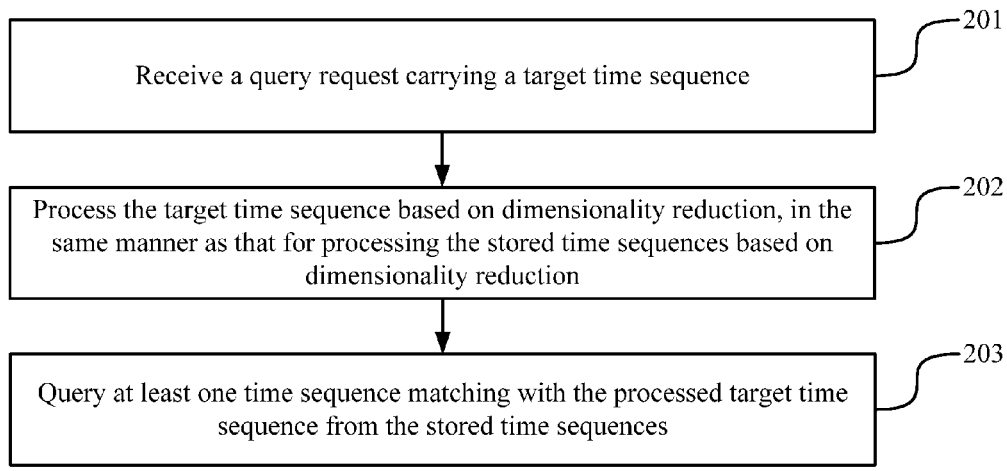
FIG. 2 is a flowchart of a method for retrieving a time sequence according to an embodiment of the present disclosure.

The embodiments of the present disclosure further provide a method for retrieving a time sequence. In this method, the time sequences processed based on dimensionality reduction may be pre-stored; and the way for dimensionality reduction may be any preset way for dimensionality reduction, such as traditional PLA and fixed-length PLA. Preferably, the time sequences processed by the above method for processing a time sequence based on dimensionality reduction according to the embodiments may be pre-stored, and the specific process may refer to the above detailed description of step 102 and will not be described herein any further. As shown in FIG. 2, the process of this method includes the following steps:

Step 201: A query request carrying a target time sequence is received, where the time length of the target time sequence is the same as that of the stored time sequences.

Step 202: The target time sequence is processed based on dimensionality reduction, in the same manner as that for processing the stored time sequences based on dimensionality reduction. If the target time sequence is processed based on dimensionality reduction by the method for processing a time sequence based on dimensionality reduction according to the embodiments, the specific process may refer to the above detailed description of step 102 and will not be described herein any further.

Step 203: at least one time sequence matching with the processed target time sequence is queried from the stored time sequences.

Both of the processed target time sequence and the stored time sequences are recorded with a series of data of line segments, so all time sequences may be represented as a broken line. The processed target time sequence is matching with a stored time sequence, that is, the degree of approximation of data thereof meets a certain requirement, or the degree of approximation between the broken lines corresponding to the sequences meets a certain requirement. Specifically, a manner for determining whether or not they are matched is to determine whether the absolute value of a distance between the processed target time sequence and the stored time sequences is smaller than a certain preset distance threshold; if positive, the processed target time sequence and the stored time sequences are matched, and if negative, they are not matched.

Several methods are available for calculating a distance between two time sequences. Preferably, the distance may be calculated by the method as follows: the area of a figure, formed by the broken lines corresponding to the processed target time sequence and the stored time sequences within a time length range thereof, is calculated. Here, the distance between the time sequences may be positive or negative; correspondingly, the area of the figure may be positive or negative. Specifically, for each closed part of a figure, if an average value of the first time sequence is defined to be greater than that of the second time sequence, the area of this part is positive, otherwise negative. Alternatively, for each closed part of a figure, if an average value of the first time sequence is defined to be greater than that of the second time sequence, the area of this part is negative, otherwise positive. For a closed part in the figure, within a time range of the closed part, one of the broken lines corresponding to the two time sequences is located above another, and therefore the average value of the time sequence corresponding to that broken line is larger. After the area of each closed parts in the figure is calculated (the values of area may be positive or negative), the area of the whole figure may be obtained by adding the values of area of all the closed parts together. The area of the figure is the distance between the two time sequences.

In the embodiments of the present disclosure, a first distance corresponding to each one of the stored time sequences may also be recorded, where the first distance is a distance between the processed target time sequence and the preset reference time sequence, and is also defined as a reference distance. On this basis, step 203 may include the following steps: a second distance, which is a distance between the processed target time sequence and the reference time sequence, is acquired (the second distance is also defined as a target distance); a time sequence, where a difference between the first distance corresponding to the time sequence and the second distance is smaller than a preset second threshold, is acquired from the stored time sequences (that is, a time sequence, where a difference between the reference distance and the target distance is smaller than a preset second threshold, is acquired), and the acquired time sequence is used as the time sequence matching with the processed target time sequence.

The time length of the reference time sequence is the same as that of the stored time sequences, and time series data in the reference time sequence may be set randomly. Preferably, to be convenient to calculate the distance and to improve the processing efficiency, the reference time sequence may be set to have only one time segment to which a slope of the line segment corresponding is zero. The reference distance may be obtained by calculation after the processed time sequence is stored in the database, without any calculation during the querying.

A difference between the reference distance and the target distance is the distance between the corresponding stored time sequence and the processed target time sequence. During querying, a distance between the corresponding processed time sequence and the processed target time sequence may be determined just by simply calculating the difference between each reference distance and the target distance. After the distance is compared with the preset second threshold, an eligible time sequence, i.e., a time sequence matching with the processed target time sequence, may be determined. Compared with the prior art where the difference between the processed target time sequence and the stored time sequences is calculated in real time during the querying, the method provided in the embodiments of the present disclosure may effectively improve the processing efficiency of querying.

Preferably, an R-tree may be established for the stored time sequences, and a minimum bounding distance corresponding to each Minimum Bounding Rectangle (MBR) in the R-tree may be recorded, where the minimum bounding distance is a minimum value of the first distance (reference distance) of each time sequence in the MBR.

The R-tree is a manner for describing data based on a tree structure, and mainly used for improving the efficiency of querying data by index data. The core idea of the R-tree is to group similar data objects together, and describe each group of data objects on a tree node in a higher layer by MBRs. Since all similar data objects are contained in one MBR, when a data object matching with a target data object is queried from a database, it is just needed to search for an MBR capable of containing the target data object in each layer beginning from the highest layer to the lowermost layer, and then search for the data object matching with the target data object from the data objects in the MBR at the lowermost layer. The data object mentioned above may be a time sequence, and the R-tree may be used for describing the time sequences in a database. Both of the reference distance and the minimum bounding distance may be recorded in the R-tree.

When a new processed time sequence is stored in the database and added into the range of a certain MBR, the reference distance of this time sequence may be calculated, and it may be judged whether or not to update the minimum bounding distance of this MBR according to the reference distance. If the reference distance is smaller than the minimum bounding distance of this MBR, the minimum bounding distance of this MBR is updated to the value of the reference distance. If this MBR is full, the MBR may be partitioned into two MBRs, so that the time sequence is inserted into one of the two MBRs, and then the minimum bounding distances of the two MBRs are recorded.

The process of acquiring, from the stored time sequences, at least one time sequence where a difference between the first distance corresponding to the at least one time sequence and the second distance is smaller than the preset second threshold, and using the acquired time sequence as the time sequence matching with the processed target time sequence, according to the R-tree and the minimum bounding distance of each MBR, includes the following step of: acquiring, from the stored time sequences, at least one time sequence where a difference between the first distance corresponding to the at least one time sequence and the second distance is smaller than the preset second threshold, as the time sequence matching with the processed target time sequence, according to the recorded minimum bounding distance corresponding to the MBR in the R-tree and the first distance corresponding to the time sequence. The specific process may include the following steps of: acquiring, from the R-tree, at least one MBR where a difference between the minimum bounding distance and the second distance is smaller than the preset second threshold; and acquiring, from the time sequences in the acquired MBR, at least one time sequence where a difference between the first distance corresponding to the at least one time sequence and the second distance is smaller than the preset second threshold, and using the acquired time sequence as the time sequence matching with the processed target time sequence.

During the implementation, at least one MBR, where a difference between the minimum bounding distance and the target distance is smaller than the preset second threshold, is queried from each layer, rather than the lowermost layer, beginning from the highest layer of the R-tree, and a next query is performed in the queried MBR; and, at least one time sequence, where a difference between the reference distance and the target distance is smaller than the preset second threshold, is acquired from the lowermost layer of the R-tree, as the time sequence matching with the processed target time sequence.

During the querying process, just by simply calculating a difference between the minimum bounding distance of the MBR and the reference distance and calculating a difference between the corresponding reference distance and the target distance, querying in the R-tree may be performed. Compared with a manner in the prior art of calculating the distance in real time during querying in the R-tree, the method provided in the embodiments of the present disclosure may effectively improve the efficiency for querying in the R-tree.

The process for querying in the R-tree in the method may be achieved by the following program:

```
For a node N
    if N is a leaf node
        if Dist(N, Q)≤ϵ, result= result∪ {N}
    else// N   is a MBR
        if MinDist(N, b)⊕Dist(Q, b) ≤ϵ
            for each child N' of N
                recursively conducting the search
``` where, Q is a target time sequence processed based on PLA; ϵ is a preset second threshold; and b is a reference time sequence. The output result of the program may be result={TS1, TS2, TS3, . . . , TSn}.

In the embodiments of the present disclosure, a time sequence is processed based on dimensionality reduction based on PLA where a time length of a time segment is unfixed and is an integral multiple of a preset unit time length. As such, compared with fixed-length PLA, multiple time segments in fixed-length PLA may be replaced by one time segment in PLA, thereby reducing a space for storing the time sequence.

Figure 3:
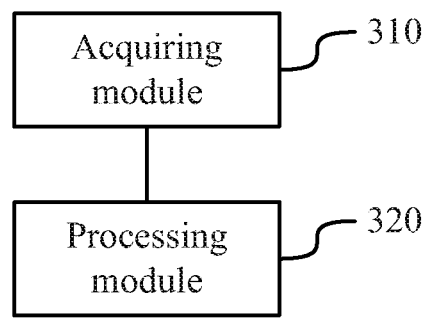
FIG. 3 is a schematic structural diagram of a device for processing a time sequence based on dimensionality reduction according to an embodiment of the present disclosure.

Based on the same technical conception, an embodiment of the present disclosure further provide a device for processing a time sequence based on dimensionality reduction, as shown in FIG. 3, including:

an acquiring module 310, configured to acquire at least one to-be-processed time sequence; and a processing module 320, configured to process the at least one time sequence based on PLA where a time length of a time segment is unfixed and is an integral multiple of a preset unit time length.

Preferably, the processing module 320 is specifically configured to:

process the at least one time sequence based on PLA where the time length of the time segment is a preset unit time length, a time length of the time sequence being an integral multiple of the unit time length; and merge a plurality of sequentially contiguous time segments, if line segments corresponding to the plurality of sequentially contiguous time segments, among all time segments with the time length being the unit time length, meet a preset approximate condition.

Preferably, the processing module 320 is specifically configured to: merge a plurality of sequentially contiguous time segments, if the absolute value of a slope difference between the line segments corresponding to the plurality of sequentially contiguous time segments, among all time segments with the time length being the unit time length, is smaller than a preset first threshold.

Preferably, the processing module 320 is specifically configured to:

determine at least one time point within a time range corresponding to a time length of the time sequence, a time length from the time point to a start time point or an end time point of the time sequence being an integral multiple of the preset unit time length, and the time length of the time sequence being an integral multiple of the unit time length;

select at least one boundary time point of a time segment from the determined time points according to time points of peaks and troughs in a waveform of the time sequence; and process the at least one time sequence based on PLA according to the selected boundary time points of the time segments.

Preferably, the processing module 320 is specifically configured to: select, from the determined time points, at least one time point, from which a distance to the time point of each peak is smaller than the unit time length, and at least one time point, from which a distance to the time point of each trough is smaller than the unit time length, and use the selected time points as the boundary time points of the time segment.

Preferably, the processing module 320 is specifically configured to: select, from the determined time points, at least one time point, from which a distance to the time point of each peak is minimum, and at least one time point, from which a distance to the time point of each trough is minimum, and use the selected time points as the boundary time points of the time segment.

Preferably, the device further includes a storing module configured to store the time sequence processed.

Figure 4:
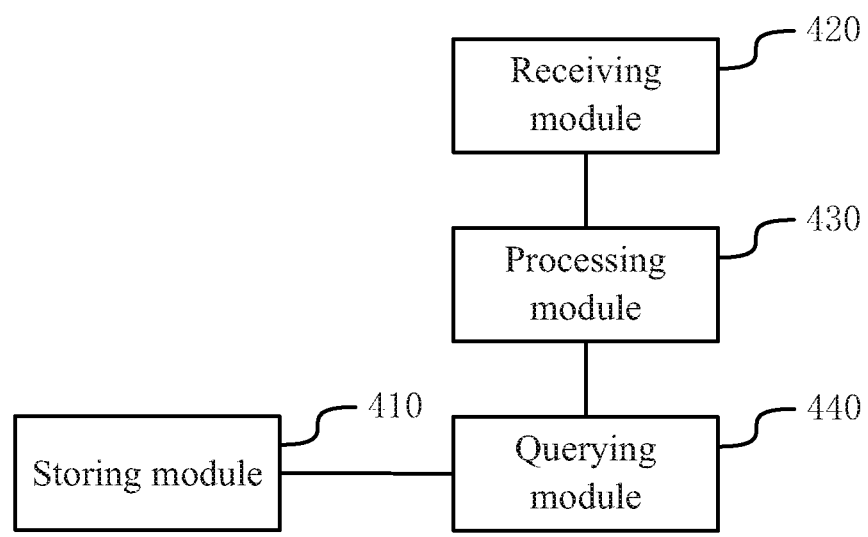
FIG. 4 is a schematic structural diagram of a device for retrieving a time sequence according to an embodiment of the present disclosure.

Based on the same technical conception, an embodiment of the present disclosure further provides a device for retrieving a time sequence, as shown in FIG. 4, including:

a storing module 410, configured to pre-store the time sequences processed based on dimensionality reduction, such as traditional PLA and fixed-length PLA; preferably, the storing module 410 is configured to pre-store the time sequences processed by the device for processing a time sequence based on dimensionality reduction;

a receiving module 420, configured to receive a query request carrying a target time sequence;

a processing module 430, configured to process the target time sequence based on dimensionality reduction, in the same manner as that for processing the stored time sequences based on dimensionality reduction; and a querying module 440, configured to query, from the stored time sequences, at least one time sequence matching with the processed target time sequence.

Preferably, the storing module 410 is further configured to: record a first distance corresponding to each one of the stored time sequences, the first distance being a distance from the stored time sequence to a preset reference time sequence.

Preferably, the querying module 440 is configured to:

acquire a second distance, the second distance being a distance from the processed target time sequence to the preset reference time sequence; and acquire, from the stored time sequences, at least one time sequence where a difference between the first distance corresponding to the at least one time sequence and the second distance is smaller than a preset second threshold, and use the acquired time sequence as the time sequence matching with the processed target time sequence.

Preferably, the storing module 410 is further configured to: establish an R-tree for the stored time sequences; and record a minimum bounding distance corresponding to each MBR in the R-tree, the minimum bounding distance being a minimum value of the first distance of each time sequence in the MBR.

The querying module 440 is configured to: acquire, from the stored time sequences, at least one time sequence where a difference between the first distance corresponding to the at least one time sequence and the second distance is smaller than a preset second threshold, and use the acquired time sequence as the time sequence matching with the processed target time sequence, according to the recorded minimum bounding distance corresponding to the MBR in the R-tree and the first distance corresponding to the time sequence.

Preferably, the querying module 440 is configured to:

acquire, from the R-tree, at least one MBR where a difference between the minimum bounding distance and the second distance is smaller than the second threshold; and acquire, from the time sequences in the acquired MBR, at least one time sequence where a difference between the first distance corresponding to the at least one time sequence and the second distance is smaller than the preset second threshold, as the time sequence matching with the processed target time sequence.

In the embodiments of the present disclosure, a time sequence is processed based on dimensionality reduction based on PLA where a time length of a time segment is unfixed and is an integral multiple of a preset unit time length. As such, when compared with fixed-length PLA, multiple time segments in fixed-length PLA may be replaced by one time segment in PLA, thereby reducing a space for storing the time sequence.

It should be noted that, the device for processing a time sequence based on dimensionality reduction provided in the above embodiments is illustrated through the division of the above all functional modules by way of example only when processing a time sequence based on dimensionality reduction. However, in practice, the above functions may be implemented by different functional modules according to actual need, that is, the internal structures of the device may be partitioned into different functional modules for completing all or part of the functions described above. In addition, the device for processing a time sequence based on dimensionality reduction by the above embodiments and the method for processing a time sequence based on dimensionality reduction are of the same conception. The specific implementation process is disclosed in the embodiment of the method and will not be described herein any further.

It should be appreciated by persons of ordinary skill in the art that all or a part of the steps of the above embodiments may be implemented by hardware or a program instructing related hardware. The program may be stored in a computer readable storage medium. The storage medium mentioned above may be a read-only memory, a magnetic disk, an optical disk, etc.

The description above only illustrates preferred embodiments of the present disclosure and thus does not intend to limit the scope thereof. Any modification, equivalent replacement, or improvement that may be made to these embodiments without departing from the principle of the present disclosure shall fall into the protection scope thereof.

What is claimed is:

1. A method for processing a time sequence based on dimensionality reduction, comprising:

acquiring at least one time sequence; and processing, using a processor apparatus, the at least one time sequence based on Piecewise Linear Approximation (PLA), wherein a time length of a time segment processed by PLA is unfixed and is an integral multiple of a preset unit time length, the processing further comprising:

determining at least one time point within a time range corresponding to a time length of the time sequence, a time length from the time point to a start time point or an end time point of the time sequence being an integral multiple of the preset unit time length, and the time length of the time sequence being an integral multiple of the unit time length;

selecting at least one boundary time point of a time segment from the determined time point according to time points of peaks and troughs in a waveform of the time sequence, wherein the selecting includes selecting, from the determined time point, at least one time point, from which a distance to the time point of each peak is smaller than the unit time length, and at least one time point, from which a distance to the time point of each trough is smaller than the unit time length, and using the selected time point as the boundary time point of the time segment; and processing the at least one time sequence based on PLA according to the selected boundary time point of the time segment.

2. The method according to claim 1, wherein the processing the at least one time sequence based on PLA wherein a time length of a time segment processed by PLA is unfixed and is an integral multiple of a preset unit time length comprises:

processing the at least one time sequence based on PLA where the time length of the time segment is a preset unit time length, a time length of the time sequence being an integral multiple of the unit time length; and merging a plurality of sequentially contiguous time segments, if line segments corresponding to the plurality of sequentially contiguous time segments, among all time segments with the time length being the unit time length, meet a preset approximate condition.

3. The method according to claim 2, wherein merging a plurality of sequentially contiguous time segments, if line segments corresponding to the plurality of sequentially contiguous time segments, among all time segments with the time length being the unit time length, meet a preset approximate condition, comprises:

merging the plurality of sequentially contiguous time segments, if the absolute value of a slope difference between the line segments corresponding to the plurality of sequentially contiguous time segments, among all time segments with the time length being the unit time length, is smaller than a preset first threshold.

4. The method according to claim 1, wherein selecting at least one boundary time point of a time segment from the determined time points according to time points of peaks and troughs in a waveform of the time sequence, comprises:

selecting, from the determined time point, at least one time point, from which a distance to the time point of each peak is minimum, and at least one time point, from which a distance to the time point of each trough is minimum, and using the selected time point as the boundary time point of the time segment.

5. The method according to claim 1, wherein after processing the at least one time sequence based on PLA wherein a time length of a time segment processed by PLA is unfixed and is an integral multiple of a preset unit time length, the method further comprises:
storing the processed time sequence.

6. A method for retrieving a time sequence, the method comprising:
storing a plurality of time sequences;
processing the stored time sequences based on dimensionality reduction;
receiving a query request carrying a target time sequence;
processing the target time sequence based on dimensionality reduction, in the same manner as that for processing the stored time sequences based on dimensionality reduction; and
querying, from the stored time sequences, at least one time sequence matching with the processed target time sequence;
recording a first distance corresponding to each one of the stored time sequences,
the first distance being a distance from the stored time sequence to a preset reference time sequence;
the querying, from the stored time sequences, at least one time sequence matching with the processed target time sequence comprises:
acquiring a second distance, the second distance being a distance from the processed target time sequence to the preset reference time sequence; and
acquiring, from the stored time sequences, at least one time sequence where a difference between the first distance corresponding to the at least one time sequence and the second distance is smaller than a preset second threshold, and
using the acquired time sequence as the time sequence matching with the processed target time sequence.

7. The method according to claim 6, wherein, the method further comprises:
recording a first distance corresponding to each one of the stored time sequences, the first distance being a distance from the stored time sequence to a preset reference time sequence;
the querying, from the stored time sequences, at least one time sequence matching with the processed target time sequence comprises:
acquiring a second distance, the second distance being a distance from the processed target time sequence to the preset reference time sequence; and
acquiring, from the stored time sequences, at least one time sequence where a difference between the first distance corresponding to the at least one time sequence and the second distance is smaller than a preset second threshold, and using the acquired time sequence as the time sequence matching with the processed target time sequence.

8. The method according to claim 7, further comprising:
establishing an R-tree for the stored time sequences; and
recording a minimum bounding distance corresponding to each Minimum Bounding Rectangle (MBR) in the R-tree, the minimum bounding distance being a minimum value of the first distance of each time sequence in the MBR;
acquiring, from the stored time sequences, at least one time sequence where a difference between the first distance corresponding to the at least one time sequence and the second distance is smaller than a preset second threshold, and using the acquired time sequence as the time sequence matching with the processed target time sequence, comprises:
acquiring, from the stored time sequences, at least one time sequence where a difference between the first distance corresponding to the at least one time sequence and the second distance is smaller than a preset second threshold, and using the acquired time sequence as the time sequence matching with the processed target time sequence, according to the recorded minimum bounding distance corresponding to the MBR in the R-tree and the first distance corresponding to the time sequence.

9. The method according to claim 8, wherein acquiring, from the stored time sequences, at least one time sequence where a difference between the first distance corresponding to the at least one time sequence and the second distance is smaller than a preset second threshold, and using the acquired time sequence as the time sequence matching with the processed target time sequence, according to the recorded minimum bounding distance corresponding to the MBR in the R-tree and the first distance corresponding to the time sequence, comprises:
acquiring, from the R-tree, at least one MBR where a difference between the minimum bounding distance and the second distance is smaller than the preset second threshold;
acquiring, from the time sequences in the acquired MBR, at least one time sequence where a difference between the first distance corresponding to the at least one time sequence and the second distance is smaller than the preset second threshold, as the time sequence matching with the processed target time sequence.

10. A device comprising one or more computer processors for processing a time sequence based on dimensionality reduction, further comprising:
an acquiring module, configured to acquire at least one time sequence; and
a processing module, configured to process the at least one time sequence based on Piecewise Linear Approximation (PLA) wherein a time length of a time segment processed by PLA is unfixed and is an integral multiple of a preset unit time length, the processing module being further configured to:
determine at least one time point within a time range corresponding to a time length of the time sequence,
a time length from the time point to a start time point or an end time point of the time sequence being an integral multiple of the preset unit time length, and
the time length of the time sequence being an integral multiple of the unit time length;
select at least one boundary time point of a time segment from the determined time point according to time points of peaks and troughs in a waveform of the time sequence;
process the at least one time sequence based on PLA according to the selected boundary time point of the time segment; and
select, from the determined time point, at least one time point, from which a distance to the time point of each peak is smaller than the unit time length, and at least one time point, from which a distance to the time point of each trough is smaller than the unit time length, and use the selected time point as the boundary time point of the time segment.

11. The device according to claim 10, wherein the processing module is specifically configured to:
   process the at least one time sequence based on PLA where the time length of the time segment is a preset unit time length, a time length of the time sequence being an integral multiple of the unit time length; and
   merge a plurality of sequentially contiguous time segments, if line segments corresponding to the plurality of sequentially contiguous time segments, among all time segments with the time length being the unit time length, meet a preset approximate condition.

12. The device according to claim 11, wherein the processing module is specifically configured to:
   merge a plurality of sequentially contiguous time segments, if the absolute value of a slope difference between the line segments corresponding to the plurality of sequentially contiguous time segments, among all time segments with the time length being the unit time length, is smaller, than a preset first threshold.

13. The device according to claim 10, wherein the processing module is specifically configured to:
   select, from the determined time points, at least one time point, from which a distance to the time point of each peak is minimum, and at least one time point, from which a distance to the time point of each trough is minimum, and use the selected time point as the boundary time point of the time segment.

14. The device according to claim 10, further comprising: a storing module, configured to store the time sequence processed.

15. A device comprising one or more computer processors for retrieving a time sequence, further comprising:
   a storing module, configured to pre-store a plurality of time sequences processed based on dimensionality reduction;
   a receiving module, configured to receive a query request carrying a target time sequence;
   a processing module, configured to process the target time sequence based on dimensionality reduction, in the same manner as that for processing the stored time sequences based on dimensionality reduction; and
   a querying module, configured to query, from the stored time sequences, at least one time sequence matching with the processed target time sequence, wherein:
   the storing module is further configured to:
   record a first distance corresponding to each one of the stored time sequences, the first distance being a distance from the stored time sequence to a preset reference time sequence; and
   the querying module is further configured to:
   acquire a second distance, the second distance being a distance from the processed target time sequence to the preset reference time sequence; and
   acquire, from the stored time sequences, at least one time sequence where a difference between the first distance corresponding to the at least one time sequence and the second distance is smaller than a preset second threshold, and use the acquired time sequence as the time sequence matching with the processed target time sequence.

16. The device according to claim 15, wherein the storing module is further configured to:
   establish an R-tree for the stored time sequences; and record a minimum bounding distance corresponding to each Minimum Bounding Rectangle (MBR) in the R-tree, the minimum bounding distance being a minimum value of the first distance of each time sequence in the MBR;
   acquire, from the stored time sequences, at least one time sequence where a difference between the first distance corresponding to the at least one time sequence and the second distance is smaller than a preset second threshold, and use the acquired time sequence as the time sequence matching with the processed target time sequence, according to the recorded minimum bounding distance corresponding to the MBR in the R-tree and the first distance corresponding to the time sequence.

17. The device according to claim 16, wherein the querying module is further configured to:
   acquire, from the R-tree, at least one MBR where a difference between the minimum bounding distance and the second distance is smaller than the second threshold; and
   acquire, from the time sequences in the acquired MBR, at least one time sequence where a difference between the first distance corresponding to the at least one time sequence and the second distance is smaller than the preset second threshold, as the time sequence matching with the processed target time sequence.

* * * * *